INVENTOR.
FRED W. JACKMAN
BY W K Beatty
ATTORNEY

INVENTOR.
FRED W. JACKMAN
BY W. E. Beatty
ATTORNEY

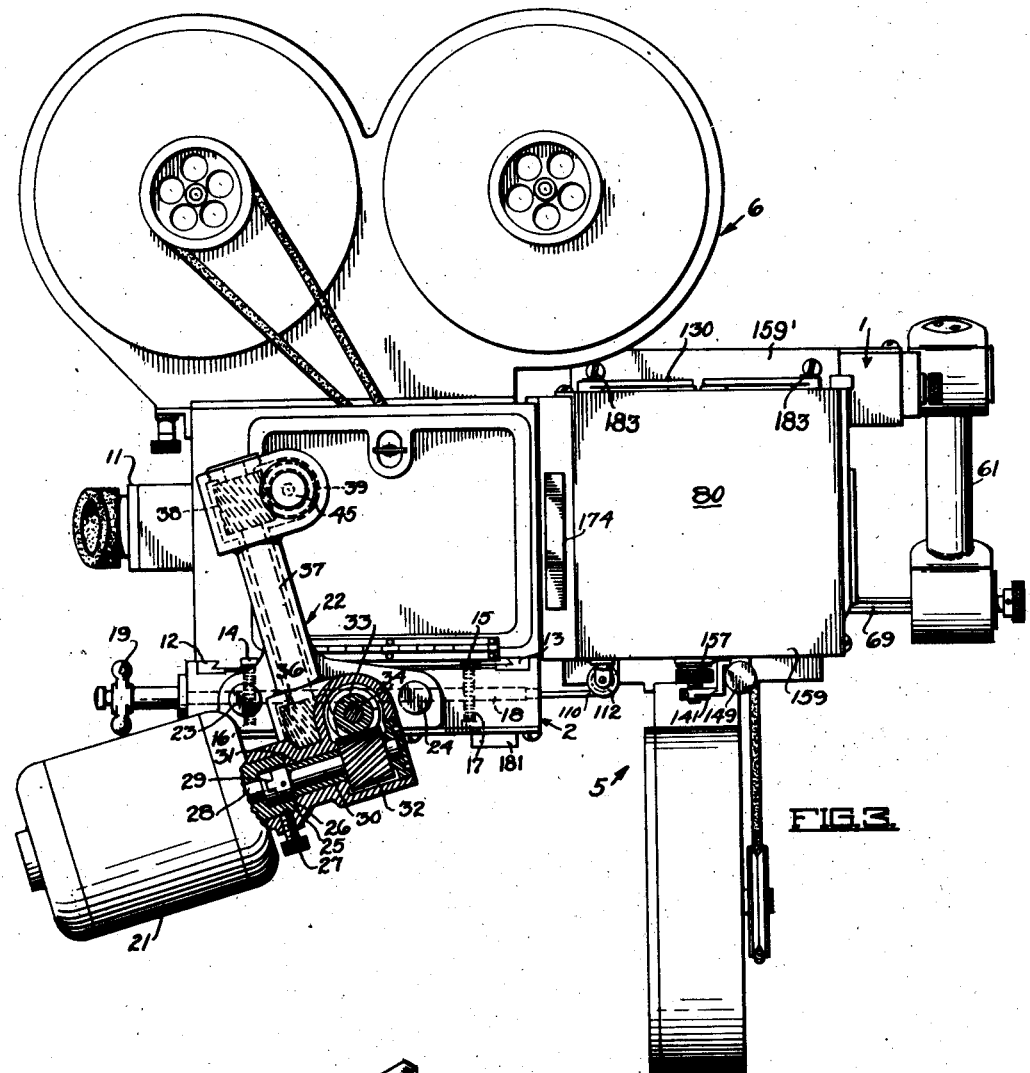

April 11, 1939.  F. W. JACKMAN  2,153,892
DOUBLE CAMERA
Filed April 4, 1936  5 Sheets-Sheet 4

INVENTOR.
FRED W. JACKMAN
BY W. E. Beatty
ATTORNEY

April 11, 1939. F. W. JACKMAN 2,153,892
DOUBLE CAMERA
Filed April 4, 1936 5 Sheets-Sheet 5
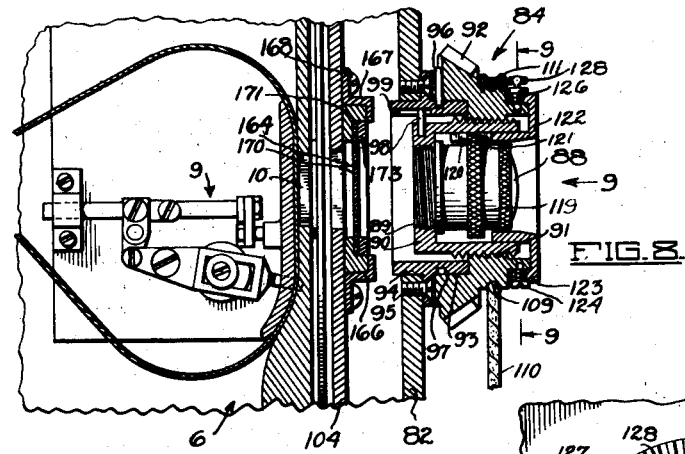
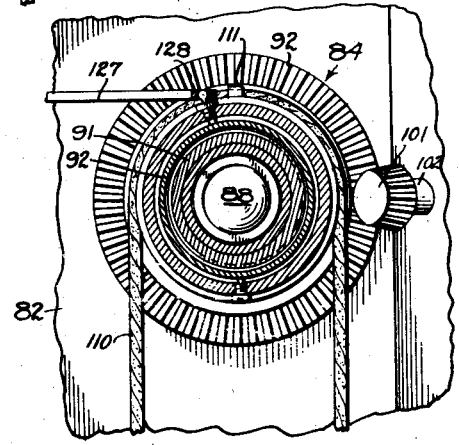
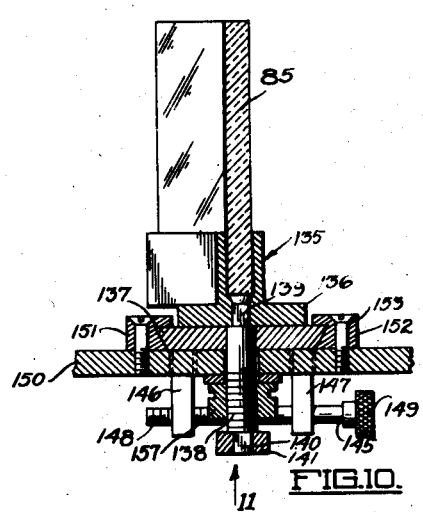
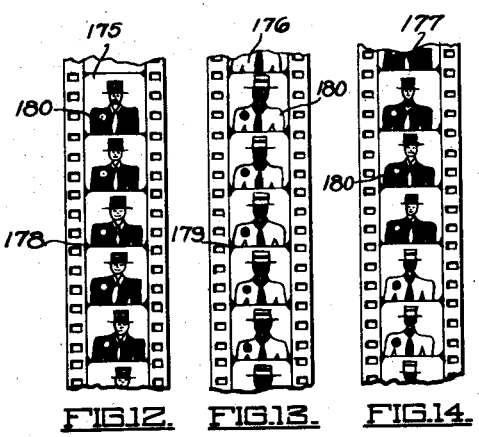
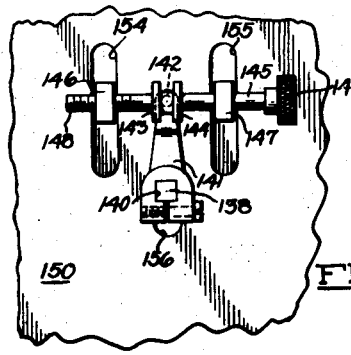
INVENTOR
FRED W. JACKMAN
BY
ATTORNEY Patented Apr. 11, 1939

2,153,892

UNITED STATES PATENT OFFICE 2,153,892

DOUBLE CAMERA

Fred W. Jackman, Beverly Hills, Calif., assignor to Warner Bros. Pictures, Inc., Burbank, Calif., a corporation of Delaware Application April 4, 1936, Serial No. 72,735

15 Claims. (Cl. 88—16)

This invention relates to the art of photography and particularly to apparatus for producing multiple, trick, or color films.

An object of the invention is to provide a simple and compact double camera arrangement. This is accomplished by providing a camera support adapted to carry two motion picture camera bodies angularly displaced from each other. A lightproof lens compartment is provided on the support to carry the objective lenses of each of the photographing cameras as well as a semi-transparent mirror which is placed at the intersection of the optical axes of the cameras to allow light rays from a scene being photographed to be directed equally to each camera. The lens compartment is entirely enclosed except for a window on one side thereof to allow the light rays from a scene to reach the mirror, thus preventing stray light from reaching either of the cameras and providing a dustproof partition for the camera lenses and mirror. The invention relates particularly to a standard type of motion picture camera having a film magazine extending beyond the front wall of the camera. Compactness of the front walls of the two cameras with the above mentioned light divider and lens compartment is provided by supporting two such cameras not only at right angles but also in upside down relation to each other whereby the front of the film magazines project away from each other in different planes thereby permitting the front walls of the two cameras to be brought closely adjacent to each other in right angular relationship.

A further object of the invention is to adjust the semi-transparent mirror of a double camera arrangement for rectilinear and angular movement. This is accomplished by providing a slide for moving the mirror rectilinearly in a plane parallel to a plane through the optical axes of the two cameras. A support carrying the mirror is rotatably mounted on the slide and has a crank operatively associated therewith which is engaged by a screw threadably carried by the slide.

An outstanding feature of the invention resides in the fact that two films may be simultaneously photographed from the same point of view, each film having pictures which are identical in size, shape and form with the pictures of the other film. Also the tonal values of the two films may, as desired, be identical or different. In case two negative films are required as in some types of trick photography or in production printing, the above feature eliminates the necessity of printing in order to obtain a second negative. Further, the invention may be advantageously employed as a safety measure in cases where it would be difficult to re-photograph the scene which ordinarily might be necessitated due to breakage or buckling of the film in the camera or due to maladjustment of the shutter opening or lens stop. For example, in photographing an expensive set or scene which is to be destroyed during the photographing thereof one of the cameras of the double camera arrangement would be adjusted with a different shutter opening, lens stop or even focus. If, on developing the two films it is found that portions of one film are superior to the corresponding portions of the other film, these selected portions could be directly substituted or inter-cut with the other film.

A further feature of the invention resides in the fact that in composite photography wherein a traveling mat is employed to block out portions of the background picture which is to be later occupied by the foreground action, the invention may be utilized to photograph both the traveling mat and the foreground action simultaneously. This is accomplished by employing one of the cameras to photograph or produce the traveling mat film and the other camera to photograph the foreground action film. In this case the foreground action would be photographed preferably in front of a black drop. The mat film would be so photographed or treated after photographing that the portion of each frame to be occupied by the foreground action would be opaque and the adjacent portion to be occupied by the background would be clear. The mat would then be superimposed on an original background film to print a second background film with the portion to be later occupied by the foreground action completely blocked out. In a subsequent printing operation the foreground action is printed on the unexposed portions of the second background film in a manner well known to those skilled in the art. Of course, the mat may obviously be employed for the background action in lieu of the foreground action.

A further feature of the invention resides in its adaptation to color photography. When so employed, filters of complementary colors such as red and blue may be used, one being placed in each of the two cameras. In this case the films of the two cameras are preferably run in the same direction, with their emulsion coated surfaces toward their respective objective lenses. After development the positive printed films obtained from the negatives thus photographed in the two cameras may be cemented together with their respective emulsion surfaces in contact to produce a natural color film.

Referring to the accompanying drawings,

Fig. 3 is a side elevation view with parts broken away, taken in the direction of the arrow 3 in Fig. 1.

Fig. 4 is a perspective view of one of the color filters provided in the attachment.

Fig. 6 is a view similar to that of Fig. 3 but with parts in section.

Fig. 9 is a sectional view of a portion of one of the cameras and an objective lens mount therefor and is taken along the line 9—9 of Fig. 8.

Fig. 10 is a sectional elevation view of the semi-transparent mirror and its adjustment, and is taken along the line 10—10 of Fig. 6.

Fig. 11 is a bottom view of the mirror adjustment and is taken in the direction of the arrow 11 in Fig. 10.

Figs. 12-14 show sections of film having pictures produced thereon by means of the double camera attachment.

Figure 8:
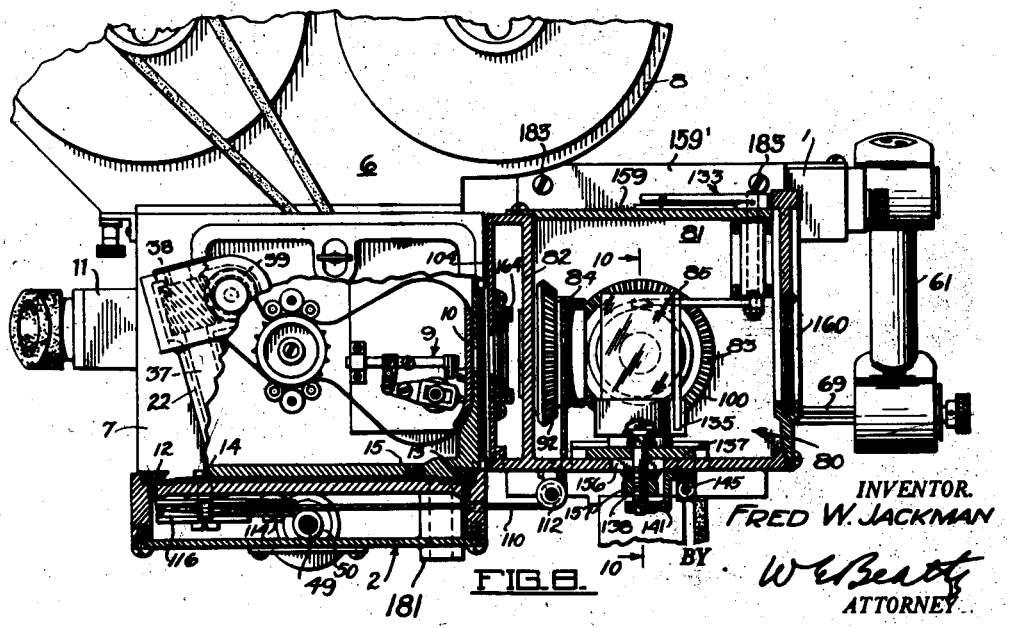
Fig. 8 is a sectional elevation view through an objective lens mount and photographing aperture and is taken along the line 8—8 of Fig. 1.

Referring to Figs. 1-5, the double camera attachment embodies a camera mount comprising a pair of spaced horizontal camera plate members 1 and 2 which are held in spaced vertical relation to each other by a pair of brackets 3 and 4. The upper plate member 1 is adapted to support a motion picture camera 5 in an upside down position. The camera plate member 2 is adapted to support a second motion picture camera 6 in an upright position and at right angles to the camera 5. The plate members 1 and 2 are so spaced that the optical axes of the cameras 5 and 6 will both lie in the same horizontal plane extending beyond the front wall of the camera. Both of the cameras 5 and 6 are shown as being of a standard type, such as is known in the art as the Mitchell camera, each comprising a camera body 7 (Fig. 6) having a film magazine 8 thereon. A pull down mechanism 9 is provided to intermittently move the film past a photographing aperture 10 (Figs. 6 and 8). A focusing tube 11 is provided on the side of the camera to enable the operator to focus the objective lens thereof.

A socket 181 depending from plate 2, as shown in Figs. 3 and 8 is provided to support the double camera unit from a suitable pin not shown.

Figure 1:
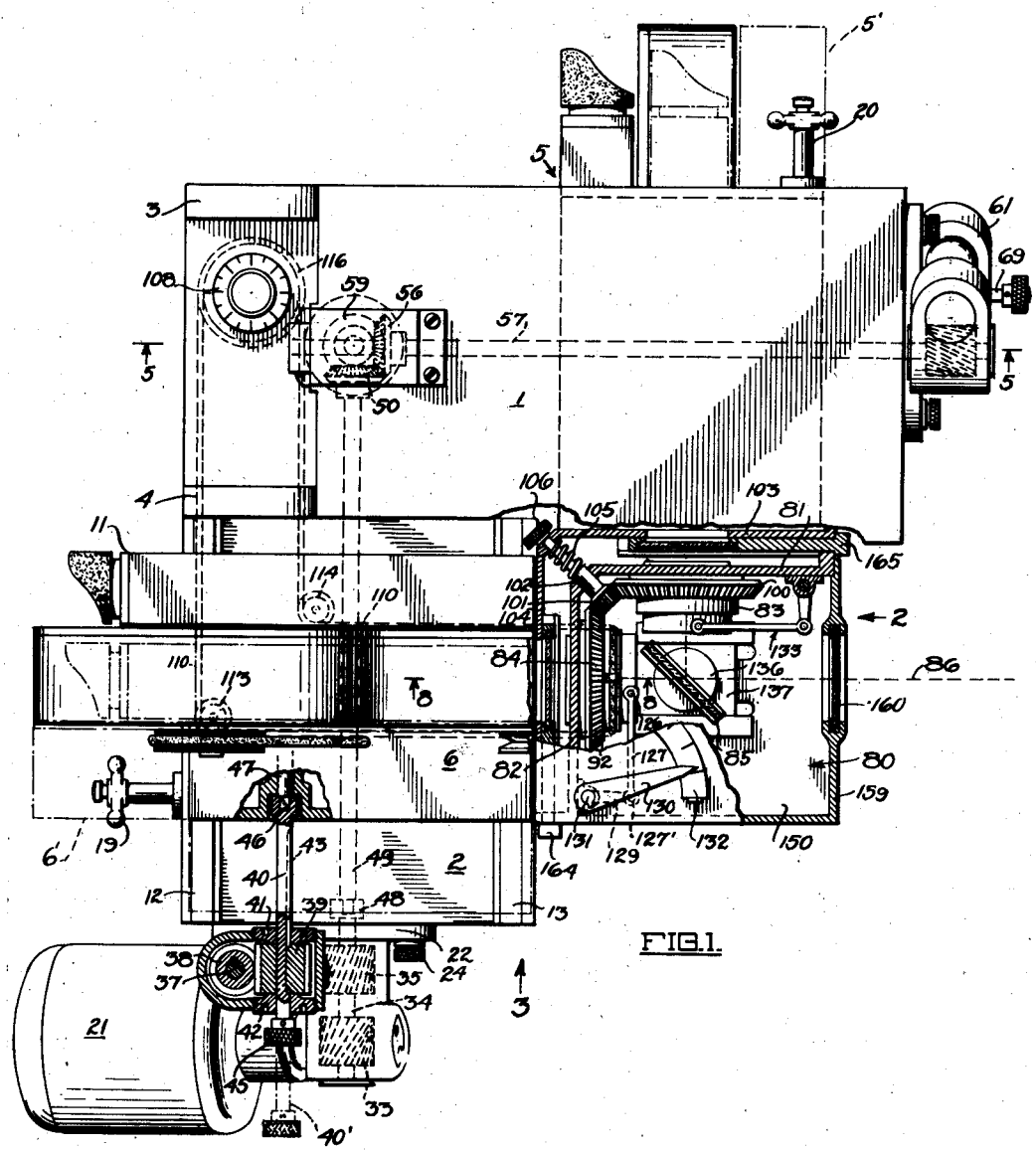
Fig. 1 is a plan view of the double camera attachment with parts in section.

In order to move either of the cameras 5 and 6 sideways into focusing position, each of the plate members 1 and 2 is provided with dove-tailed slides 12 and 13. These slides 12 and 13 are adapted to be slidably engaged by mating dove-tailed slides provided on the under surface of each of the cameras 5 and 6. Gear racks 14 and 15 are also provided on the under surface of each of the cameras 5 and 6, parallel to the slides 12 and 13, and are engaged by spur gears 16 and 17 (Fig. 3) which are secured upon a transverse camera racking shaft 18. Shaft 18 is journaled within the sides of the plate member 2 and has a handle 19 provided thereon whereby the camera 6 may be racked into a focusing position so as to allow the focusing tube 11 to be brought in line with the objective lens for the camera 6. A similar racking arrangement 20 is provided for the camera 5. Thus, the focusing positions of the cameras 5 and 6 are indicated by the dotted line positions 5' and 6' (Fig. 1).

Both of the cameras 5 and 6 are adapted to be simultaneously and synchronously driven by a single motor 21. A motor adaptor 22 is secured to the forward end of the plate member 2 by means of knurled clamp screws 23 and 24. The adaptor 22 has an enlarged socket 25 (Fig. 3) which receives a projecting shoulder portion 26 on the forward end of the motor 21. A clamp screw 27 is provided to hold the motor 21 in engagement with the adaptor 22. The motor shaft 28 of motor 21 is coupled at 29 to a stub shaft 30 within the adaptor 22. Shaft 30 is journaled within a bearing 31 and has a spiral gear 32 which meshes with a second spiral gear 33 secured upon a horizontally extending shaft 34 (Fig. 1). A third spiral gear 35 is also provided on the shaft 34 and meshes with a mating spiral gear 36 (Fig. 3) provided on the lower end of a vertical shaft 37. Shaft 37 has another spiral gear 38 secured at its upper end which meshes with a mating spiral gear 39. Gear 39 is slidably keyed upon a camera driving shaft 40 (Fig. 1) which is journaled within bearing caps 41 and 42 provided on the upper end portion of the adaptor 22. The shaft 40 has a long key way 43 therein and is slidable longitudinally by means of a knob 45 formed on the projecting end thereof. The inner end of the shaft 40 has a suitable coupling connection 46 through which it is adapted to drive the camera shaft 47 of the camera 6. When the camera 6 is to be moved into its focusing position, the shaft 40 may be pulled outwardly into the dotted line position 40' to allow the camera to be moved into its dotted line position 6'.

Figure 5:
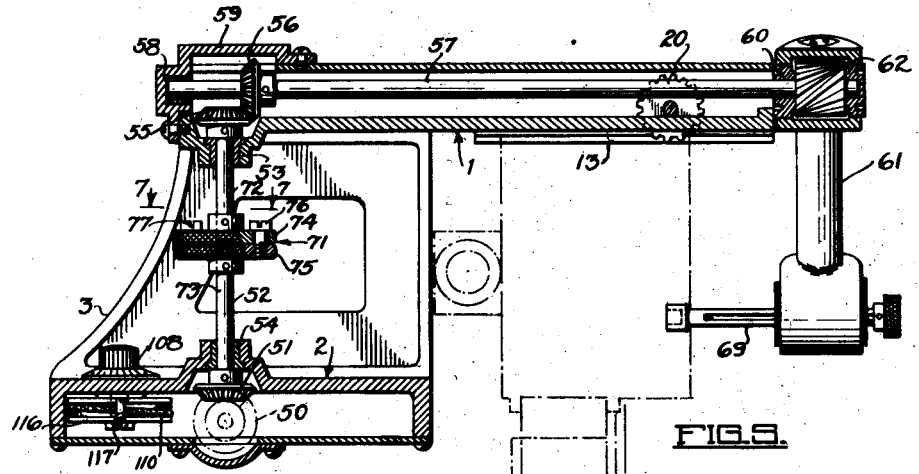
Fig. 5 is a sectional elevation view taken along the line 5—5 of Fig. 1.

The lower horizontal shaft 34 (Fig. 1) also has a coupling 48 through which it is adapted to drive a shaft 49 extending longitudinally of the plate member 2. Shaft 49 is journaled within suitable bearings (not shown) depending from the plate member 2 and has a bevel gear 50 secured to the inner end thereof. Referring to Fig. 5, a second bevel gear 51 meshing with gear 50 is secured on the lower end portion of an intermediate gear shaft 52. Shaft 52 is journaled within bearings 53 and 54 provided in the plate members 1 and 2 respectively and has a bevel gear 55 secured to its upper end. Gear 55 meshes with a mating bevel gear 56 secured upon a transverse horizontal shaft 57 which is journaled at one end in a bearing 58 provided in a bearing cap 59 and at its other end within a bearing cap 60 provided within a second adaptor 61. A spiral gear 62 is secured to the shaft 57 within the adaptor 61 and meshes with a mating spiral gear 63 (Fig. 2) provided on a vertically extending shaft 64. Shaft 64 is journaled within bearing caps 65 and 66 and has a spiral gear 67 secured to its lower end portion. Gear 67 meshes with a similar gear 68 which is mounted upon a longitudinally slidable camera driving shaft 69 (Fig. 5). Shaft 69 is identical with the shaft 40 (Fig. 1) to allow the camera 5 to be racked into its focusing position.

Figure 7:
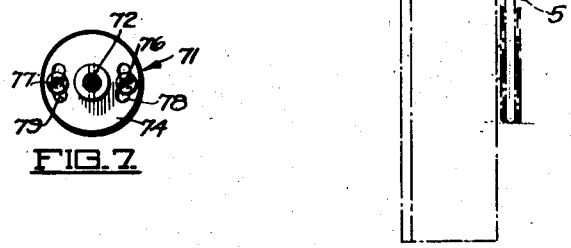
Fig. 7 is a sectional plan view of a camera synchronizing device and is taken along the line 7—7 of Fig. 5.

A synchronizing arrangement 71 (Figs. 5 and 7) is provided upon the shaft 52. Shaft 52 is split into two portions 72 and 73 having knurled disks 74 and 75 rigidly secured thereto at their adjacent ends. A pair of screws 76 and 77 pass through arcuate slots 78 and 79 formed in the disk 74 and are threadably mounted within the lower disk 75. Thus it will be seen that by unloosening the screws 76 and 77, the portions 72 and 73 of the shaft 52 may be rotatably adjusted relative to each other to synchronize the intermittent movements of the cameras 5 and 6. Also, of course, the intermittent movements of the two cameras, if desired, may be adjusted for any relative position desired instead of being synchronized.

Referring now to Figs. 1, 6 and 8, the camera attachment has a lens compartment 80. Walls 81 and 82 enclosing a portion of the compartment 80 have objective lens mounts 83 and 84 provided thereon. A semi-transparent mirror 85 is provided at the intersection of the optical axes of the lens mounts 83 and 84. Mirror 85 is formed of glass or other suitable transparent material which has been rendered semi-transparent as by subliming or sputtering a thin coating of platinum on one surface thereof. Mirror 85 is placed at an angle usually about 45° to the optical axis of each of the cameras 5 and 6 so as to split and direct an image ray (shown by the dotted line 86, Fig. 1) into both of the objective lens mounts 83 and 84 whereby it may be simultaneously recorded in each of the cameras 5 and 6.

Referring now to Fig. 8, the objective lens 88 of the camera 6 is threadably secured at 89 within a lens adaptor 90. Adaptor 90 has an externally threaded portion 91 which is adapted to be engaged by a mating threaded portion formed within a bevel gear 92. Gear 92 has a bearing portion 93 which is journaled upon a shoulder projecting from a sleeve 94 secured to the wall 82 as by screws 95. A pin 96 provided in the gear 92 engages a circumferential groove 97 formed on the outer circumference of the sleeve 94 to prevent endwise movement of the bevel gear 92. The adaptor 90 has a pin 98 projecting therefrom which rides within a groove 99 formed longitudinally of the axis of sleeve 94. Thus it will be seen that rotation of gear 92 will cause the adaptor 90 and objective lens 88 to be moved longitudinally of the optical axis of the lens, the pin 98 serving to prevent rotation of the lens 88. The objective lens of the camera 5 is identical with that of camera 6 and has a bevel gear 100 similar to that of 92 to obtain a focusing movement. Both of the gears 92 and 100 mesh with a pinion 101 secured upon a shaft 102. Shaft 102 is journaled within bearings provided at the intersection of the two walls 81 and 82 and also at the intersection of a second pair of walls 103 and 104. A spring 105 is provided to normally retain the bevel gear 101 in mesh with the gears 92 and 100 and when it is desirable to change the focus of one of the objectives in relation to the other, the gear 101 may be withdrawn from the mesh by means of a knob 106 provided on the end of the shaft 102 to allow one of the gears 92 or 100 to be rotated and set relative to the other. The driving gears 35, 36, 39 etc. for cameras 5 and 6 are preferably so arranged that the films being exposed are fed in the same direction past their respective photographic apertures. However, for special trick effects the films may be fed in opposite directions by re-arranging any of the gear combinations.

Figure 2:
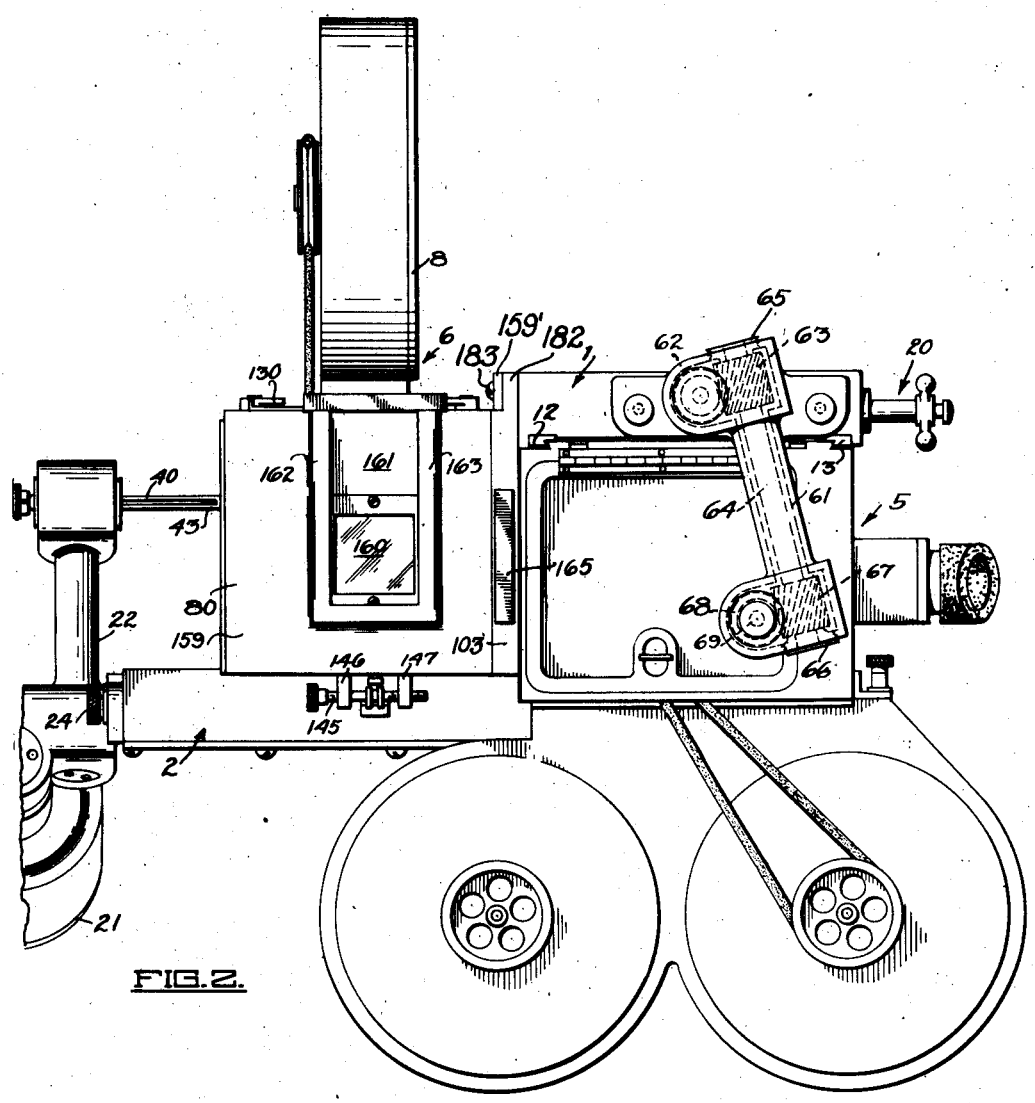
Fig. 2 is a front elevation view taken in the direction of the arrow 2 in Fig. 1.

The extended portion 182 of the wall 103 as shown in Fig. 2 and the upstanding flange 159' of the cover 159 are fastened by screws 183 to the camera plate 1, whereby the lens compartment 80 is carried by camera plate 1.

In order to focus the objective lenses of the cameras 5 and 6 simultaneously and externally of the compartment 80, a focusing knob 108 is provided at the rear of the camera attachment (Figs. 1 and 5). Referring again to Fig. 8, a circumferential groove 109 is formed along the outer circumference of the gear 92 to receive a cable 110 passed therearound. A clamping piece 111 is provided to clamp a portion of the cable 110 to the groove 109. Both ends of the cable 110 are passed through apertures provided in the base of the compartment 80 and thence around idle pulleys 112 (Fig. 6). As shown in Fig. 1, both ends of the cable 110 are then passed around the second pair of idle pulleys 113 and 114 in the base 2 which are rotatable about vertical axes. From the idle pulleys 113 and 114, the ends of the cable 110 are passed around a driving pulley 116 operatively connected to the focusing knob 108 (Fig. 5). A clamping piece 117 is provided on the pulley 116 to secure a portion of the cable 110 thereto. The knob 108 has a graduated scale along its periphery bearing indicia corresponding to the focusing of the objective lenses.

Referring to Figs. 1, 8 and 9, I shall now describe the independent iris adjustments of the objective lenses. As shown in Fig. 8, the objective lens 88 is of standard construction having a rotatable knurled sleeve 119. Rotation of the sleeve 119 causes expansion or contraction of the iris mechanism (not shown) within the barrel of the objective lens 88. A slot 120 is provided transversely of the sleeve 119 and is adapted to be engaged by a tongue 121 provided on the inner end of an iris adjusting sleeve 122. Sleeve 122 is rotatably mounted on the inner circumference of the lens adaptor 90. A rearwardly extending flange 123 on the sleeve 122 has a screw 124 threadably mounted therein. The inner end of the screw 124 projects within a guiding groove formed on the outer circumference of the gear member 92. A second screw 126 provided on the flange 123 has a ball shaped head which is adapted to be engaged by a rod 127 having a socket 128 thereon for engagement with the head of screw 126. Rod 127 is pivotally secured at its other end 127' (Fig. 1) to a lever 129 within the compartment 80. A combined operating handle and indicating pointer 130 is provided externally of the compartment 80 and is connected to the lever 129 by means of a vertically extending shaft 131. A scale 132 is provided having indicia thereon to indicate the size of the opening provided by the iris mechanism. A similar iris control 133 is provided for the objective lens of the camera 5. Although the two iris adjustments for either camera 5 or 6 are shown as being independent, it is to be understood, that with certain obvious modifications, these two mechanisms may be interconnected.

Referring now to Figs. 6, 10, and 11, the semi-transparent mirror 85 is shown as being mounted upon a support 135. Support 135 has a circular base 136 which rests upon a dove-tailed slide member 137. A stud member 138 is rotatably mounted within the member 137 and passes into the support 135 where it is suitably secured thereto by a square shank 139. Stud 138 is provided at its lower end with a square shank 140 which is engaged by one end of a crank member 141. A depending pin 142 is provided on the opposite end of the lever 141 and is engaged on either side by a pair of circular guide flanges 143 and 144 formed on a transversely extending screw 145. A pair of brackets or lugs 146 and 147 formed on the under surface of the slide member 137 are provided in which the screw member 145 is rotatably mounted. The threaded portion 148 of screw 145 engages a similarly threaded portion provided in the bracket 146. Thus it will be seen that by rotating a knob 149, provided on the screw 145, the transparent mirror 85 may be adjusted about a vertical axis to secure desirous results. Referring to Figs. 1 and 10, the slide member 137 is supported upon the base 150 of the compartment 80 and is engaged at either side by dove-tailed guides 151 and 152 which are secured to the base 150 as by screws 153. Slots 154, 155, and 156 (Fig. 11) are provided to allow the brackets 146 and 147 as well as the stud member 138 to be moved lengthwise with the slide member 137. A clamping nut 157 is threadably mounted upon the stud 138 to clamp the slide member 137 in any desired position. Therefore, it will be seen that two adjustments of the mirror 85 are provided. That is, it may be rotated about a vertical axis and may also be moved longitudinally.

A cover plate 159 (Figs. 1, 2 and 6) is provided to enclose the top and side portions of the compartment 80. A transparent window 160 is provided in front of the cover 159 to allow the image rays 86 to be passed therethrough. Window 160 is secured upon a vertically slidable member 161 which is slidable within guideways 162 and 163 on either side thereof.

As was stated before, filters are provided for each of the cameras 5 and 6 for the production of color pictures or for various trick shots and other desired results. Referring to Fig. 1, filter holders 164 and 165 are provided for the cameras 5 and 6 respectively. Each of these filters is mounted between the compartment walls as at 82 and 104 and is slidably mounted between guides 166 and 167 (Fig. 8) which are secured as by screws 168 to the wall 104. Each filter 170 (Figs. 4 and 8) is mounted within a recess 171 formed within the filter holder 164 or 165. A retaining border frame 173 is provided to hold the filter 170 within the holder. A handle 174 is provided on the outer edge of the holder 170 to allow for insertion of the filter.

One example of the type of film attainable through the use of the double camera attachment is shown in Figs. 12–14. Herein, one of the films, for example, 175 (Fig. 12) has been exposed within one of the cameras 6. The film 176 (Fig. 13) has been exposed within the other camera 5. In this example, an actor 180 is arranged in two, preferably complementary colors; his face being colored red and his coat blue. Red and blue filters corresponding to the colors of the actor are placed in the cameras 5 and 6 respectively so as to produce films having different tonal values. Thus it will be seen that the camera having a blue filter will admit only that portion of the object which is of the same color and will not admit any complementary color thereto. In the other camera, using a red filter, this condition will be directly opposite, that is, only a portion of the object showing a red color would be admitted to the film. In the final intercutting or interprinting of the two films 175 and 176, to produce a single film 177 (Fig. 14) the film 175, at a certain point, for example, 178, may be intercut with a similar portion 179 upon the film 176. This intercutting will produce a film showing a sequential motion but with any desired changing of color values or shading without necessitating similar color changes upon the object while being photographed. Although it is preferable to employ two different filters in the two cameras respectively the above mentioned tonal or color change may also be accomplished by photographing with a filter in one camera and without a filter in the other. Desired portions of either film may then be intercut as hereinbefore described. This method of photography is disclosed and claimed in my divisional application S. N. 135,983 filed April 9, 1937, for Photography.

Having thus described the invention, what is claimed as new and desired to secure by Letters Patent, is:

1. Photographic apparatus comprising a light deflector for directing light rays from an object into cameras having optical axes in the same plane, slide means for moving said deflector in a plane parallel to a plane through the optical axes of said cameras, a deflector support rotatably supported on said slide for holding said deflector, a crank operatively connected to said support for rotating said support, a screw threadably carried by said slide, and means on said screw for engaging said crank.

2. A photographic apparatus comprising means for supporting a pair of camera lenses with their optical axes at right angles to each other, means adapted to support a camera body in operative relation with each of said lenses, common adjusting means for focusing said lenses, a viewfinder attached to each of said camera bodies, and means for slidably supporting each of said camera bodies and its viewfinder whereby each of said camera bodies at certain times and its said viewfinder at other times may be aligned with its respective lens.

3. In a photographic apparatus, a pair of lenses having their optical axes at substantially right angles to each other, a light proof lens compartment having enclosing walls therefor, said lenses being mounted in two of said walls, means in said compartment for directing light rays from an object into each of said lenses, a window in said compartment to allow light rays from said object to reach said means, common adjusting means exteriorly of said compartment for adjusting said lenses along their respective optical axes, and means for slidably supporting a camera body having a front wall and a viewfinder in operative relation to each of said lenses.

4. In a photographic apparatus, a pair of lenses, means for supporting said lenses with their optical axes in angular relation to each other, a light proof lens compartment having enclosing walls therefor, said lenses being mounted in two of said walls, means in said compartment for directing light rays from an object into each of said lenses, a window in said compartment for allowing light rays from an object to reach said means, common adjusting means exteriorly of said compartment for adjusting said lenses along their respective axes, means adapted to individually adjust each of said lenses along its respective optical axis, and means for slidably supporting a camera body having a front wall and a viewfinder in operative relation to each of said lenses.

5. In a photographic apparatus a wall section, a pair of lenses mounted in said wall section with the optical axes thereof intersecting each other at substantially right angles, light deflecting means for directing a portion of the light rays from an object through one of said lenses and for allowing another portion of said rays to pass through the other of said lenses and camera supporting means in fixed relation to said wall, said means comprising a pair of camera plates in parallel planes and extending at right angles to each other, and camera supporting means on the adjacent sides of said plates.

6. In combination a plurality of camera mechanisms having their optical axes in a common horizontal plane and disposed at an angle with one another in said plane, a light divider positioned at the intersection of the optical axes of said camera mechanisms, a compartment housing said light divider, respective objective lenses for each of said camera mechanisms mounted in the walls of said compartment, a common focusing adjustment for all of said objective lenses, and a common support for said camera mechanisms having means thereon for individually shifting said cameras perpendicularly to their optical axes for view finding purposes, said compartment being mounted on said support.

7. A combination in accordance with claim 6 in which means are provided for interconnecting the focusing means of each of said objective lenses, said interconnecting means being removable for individually adjusting each of said objective lenses.

8. In combination a support for a plurality of camera mechanisms each having a viewfinder, said camera mechanisms and viewfinders being adjustable therein, a compartment having an objective lens for each of said camera mechanisms and its viewfinder, said lenses being mounted in respective walls of said compartment, a light beam splitting means positioned in said compartment, said compartment being mounted on said camera mechanisms support, and common driving means for operating all of said camera mechanisms simultaneously, said camera mechanisms being interchangeable with standard motion picture mechanisms.

9. Photographic apparatus comprising a pair of camera plates, brackets attached to said plates for supporting the same at right angles to each other in parallel planes, a camera support on each of the adjacent faces of said plates, a separate camera body on each of said camera supports, a common light divider and lens compartment for said cameras and a common power drive for said cameras.

10. Photographic apparatus according to claim 9 comprising a light dividing and lens compartment supported from one of said plates adjacent said camera supports.

11. Photographic apparatus according to claim 9 comprising a motor attached to one of said plates, a camera coupling connected to said motor and supported by said last mentioned plate, gearing connected to said motor and coupled to a second gearing attached to said other plate, and a camera coupling connected to said second gearing and supported by said other plate.

12. Photographic apparatus according to claim 9 comprising a camera coupling for each of said plates, and a power drive adapted to be operated by a single motor for both of said camera couplings.

13. Photographic apparatus comprising a camera plate, means on one side of said plate for slidably supporting a camera and its viewfinder on said plate, a motor supported by said plate, a slidable coupling for driving the camera from said motor, a rotatable shaft on the other side of said plate and adapted to drive a second camera, gearing connecting said motor and said shaft, and a light divider and lens compartment for said cameras.

14. Photographic apparatus comprising a pair of camera lenses arranged at right angles, a gear for each of said lenses, a pinion connecting said lenses, and means for driving one of said gears to drive the other of said gears through said pinion, and an adjustable mount for uncoupling said pinion from said gears.

15. Photographic apparatus comprising the combination of a pair of separate camera bodies each having a front wall and a film supply and take-up magazine overhanging said front wall, and an adaptor for said separate camera bodies comprising a light divider and lens compartment, a power drive common to said camera bodies and means for supporting said camera bodies in upside down and right angular relationship with said film magazines overhanging opposite sides of said light divider and lens compartment.

FRED W. JACKMAN.